US011533328B2

(12) United States Patent
Nunes et al.

(10) Patent No.: US 11,533,328 B2
(45) Date of Patent: Dec. 20, 2022

(54) SYSTEMS AND METHODS FOR ANALYZING VULNERABILITIES OF NETWORKED SYSTEMS

(71) Applicant: PAYPAL, INC., San Jose, CA (US)

(72) Inventors: Eric Nunes, Scottsdale, AZ (US); Bradley Wardman, Phoenix, AZ (US); Meethil Vijay Yadav, Phoenix, AZ (US); Kevin Tyers, Chandler, AZ (US); Nicole Harris, Mesa, AZ (US); Jakub Burgis, Scottsdale, AZ (US)

(73) Assignee: PayPal, Inc., San Jose, CA (US)

(*) Notice: Subject to any disclaimer, the term of this patent is extended or adjusted under 35 U.S.C. 154(b) by 653 days.

(21) Appl. No.: 16/433,688

(22) Filed: Jun. 6, 2019

(65) Prior Publication Data
US 2020/0389480 A1    Dec. 10, 2020

(51) Int. Cl.
H04L 29/06     (2006.01)
G06N 20/00     (2019.01)
H04L 9/40      (2022.01)

(52) U.S. Cl.
CPC ......... H04L 63/1433 (2013.01); G06N 20/00 (2019.01); H04L 63/1408 (2013.01); H04L 63/20 (2013.01); H04L 2463/102 (2013.01)

(58) Field of Classification Search
CPC . H04L 63/1433; H04L 63/1408; H04L 63/20; H04L 2463/102; H04L 67/02; G06N 20/00; G06N 3/08; G06F 21/57
See application file for complete search history.

(56) References Cited

U.S. PATENT DOCUMENTS

| 2005/0193430 A1* | 9/2005 | Cohen | G06F 21/577 726/25 |
| 2009/0100522 A1* | 4/2009 | Kim | H04L 63/1433 726/25 |
| 2012/0144494 A1* | 6/2012 | Cole | G02B 6/12023 726/25 |
| 2012/0255022 A1* | 10/2012 | Ocepek | H04L 63/1433 726/25 |
| 2013/0191919 A1* | 7/2013 | Basavapatna | H04L 63/1408 726/25 |
| 2018/0205749 A1* | 7/2018 | Nandha Premnath | H04W 12/128 |
| 2018/0337941 A1* | 11/2018 | Kraning | H04L 43/10 |
| 2019/0236661 A1* | 8/2019 | Hogg | G06Q 30/0282 |

(Continued)

Primary Examiner — Joseph P Hirl
Assistant Examiner — Thomas A Gyorfi
(74) Attorney, Agent, or Firm — Haynes and Boone, LLP

(57) ABSTRACT

Methods and systems for assessing and evaluating vulnerabilities of a networked system are presented. A list of known vulnerabilities that have been disclosed in the public may be obtained. The networked system may be scanned from an external perspective to obtain network information of the networked system. A subset of the known vulnerabilities may be determined to be relevant to the networked system based on correlations between the vulnerabilities and the network information. The networked system may also be analyzed from an internal perspective to determine impacts of the relevant known vulnerabilities to the networked system. The impact of a vulnerability may be determined based on the type of data and/or the type of services that may be accessible in an attack that exploits the vulnerability. The vulnerabilities may then be ranked and addressed based on the impacts.

20 Claims, 7 Drawing Sheets

(56) References Cited

U.S. PATENT DOCUMENTS

| | | | |
|---|---|---|---|
| 2019/0289025 A1* | 9/2019 | Kursun | H04L 41/16 |
| 2020/0380160 A1* | 12/2020 | Kraus | G06F 16/35 |

* cited by examiner

SYSTEMS AND METHODS FOR ANALYZING VULNERABILITIES OF NETWORKED SYSTEMS

BACKGROUND

The present specification generally relates to networked system security, and more specifically, to assessing and evaluating vulnerabilities of a networked system according to various embodiments of the disclosure.

RELATED ART

The rise of computer networking systems has enabled organizations to communicate data more efficiently. For example, an organization may connect various devices over a computer network (e.g., a local area network) such that a device within the computer network may remotely access data that is stored on different devices or data storages. Furthermore, the organization may configure the computer network to provide services (e.g., web services, data access services, etc.) to external devices (e.g., to customers, to employees working outside of the network, etc.) through one or more access points (e.g., ports of machines). For example, the organization may implement a web server that enables external devices to access one or more websites of the organization through one or more access points (e.g., port 80 of the web server). The organization may also implement a data access server (e.g., a File Transfer Protocol (FTP) server) that enables external devices to access data stored within the network through one or more access points (e.g., port 21 of the FTP server). However, opening a computer network to external devices may expose the organization to one or more network vulnerabilities, which may be exploited by malicious computer users to perform unauthorized actions (e.g., attacks) to the computer network. For example, a particular version of web server may have a security bug that enables malicious users to inject operating system commands via a web interface. In another example, a particular version of FTP server may have a security bug that allows unrestricted upload of dangerous file types (which may contain computer viruses) to the computer network.

Since organizations may configure their computer networks differently, each vulnerability may have a different impact to different organizations. Thus, there is a need for analyzing a networked system to assess the impact of each vulnerability to the corresponding organization to such that the vulnerabilities can be addressed accordingly.

Figure 1:
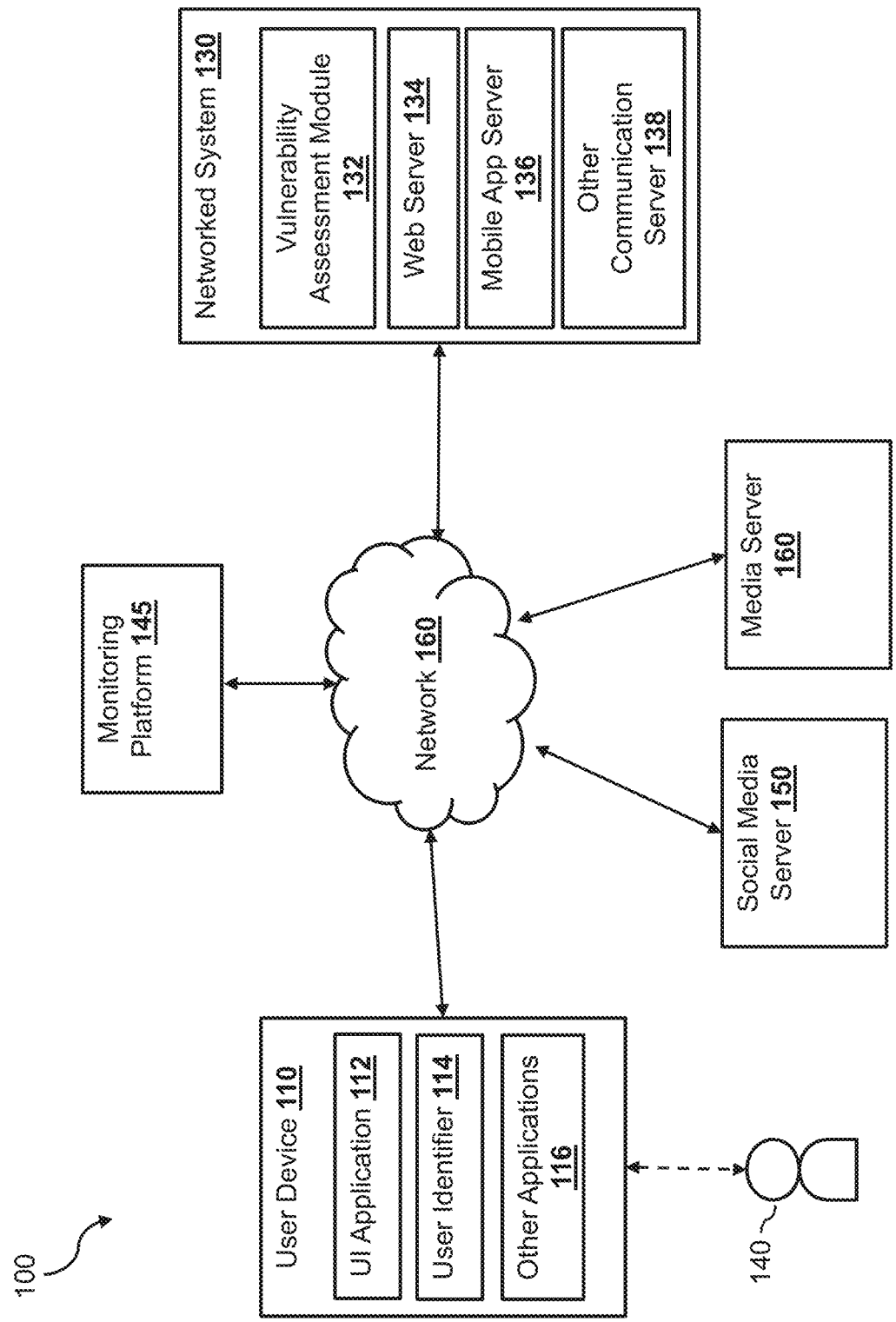
FIG. 1 is a block diagram illustrating a vulnerability assessment system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for assessing and evaluating vulnerabilities of a networked system by analyzing the networked system based on both an external perspective and an internal perspective. As discussed above, networked systems (especially those that provide external access via one or more access points) may have vulnerabilities, which may be exploited by malicious computer users to perform unauthorized actions (e.g., attacks) to the networked systems. As defined herein according to one aspect, a vulnerability of a networked system is a weakness (e.g., a defect) of the networked system that leaves open one or more ways for malicious users to gain access to the networked system. By exploiting a vulnerability, a malicious user may gain unauthorized access (unintended by the networked system) into one or more portions of the networked system. Some of the vulnerabilities may be associated with third-party tools that provide services for an organization (e.g., a web server, a file transfer server, a mobile application server, etc.). In addition, some of the vulnerabilities may be associated with the one or more access points through which external devices may access the networked system. As defined herein, an access point to a networked system is a physical or virtual point of access that enables external devices (e.g., devices external to the networked system) to access services and/or data of the networked system. In some embodiments, access points may be specific open ports of edge machines (e.g., machines of the networked system that have a connection with an external network such as the Internet), including standard ports, non-standard ports. Further yet, some of the vulnerabilities may be associated with the inherent design of the computer network (e.g., lack of security protocols between data storage that stores sensitive data and the access points).

To improve overall security of computer networks, certain computer security firms frequently discover and publish network vulnerabilities such that organizations may act to remove the vulnerabilities (e.g., by implementing computer patches) from their respective networks. The vulnerabilities that have been published (or disclosed) to the public are referred to as "known vulnerabilities." As the majority of the attacks on networked systems by malicious users (e.g., hackers) are performed by exploiting one or more of these known vulnerabilities, it is imperative for organizations to protect their networked systems based on these known vulnerabilities (e.g., by implementing computer patches within the networked systems to remove the vulnerabilities). However, as the number of disclosed (or known) software and/or hardware vulnerabilities increases every year, it has become increasingly difficult for organizations to keep up and provide fixes to all of the disclosed (or known) vulnerabilities. In fact, it has been reported that only a small portion of the known vulnerabilities have been exploited by malicious users. Thus, it may not be efficient for an organization to non-discriminately implement fixes to all of the disclosed vulnerabilities, as some vulnerabilities may have greater impact to the organization than other vulnerabilities.

Accordingly, in some embodiments, a vulnerability assessment system may analyze a networked system to determine impacts that different vulnerabilities may potentially have on the networked system, such that the organization may respond to the vulnerabilities accordingly. In some embodiments, the vulnerability assessment system may first analyze the networked system from an external perspective. As the malicious users do not have internal knowledge of the networked system (e.g., knowledge that is unobtainable based on public information of the networked system), the malicious users often rely on information and tools they may obtain from sources external to the networked system to determine how to attack the networked system. Examiner of internal knowledge may include a topology of the networked system (e.g., how devices, including devices that do not have direct access to the external network, are connected within the networked system) and current and/or future security protocols implemented at each access points. Thus, by analyzing the networked system from the external perspective, the vulnerability assessment system may predict how a malicious user would potentially attack the networked system. As defined herein according to one aspect, analyzing the networked system from the external perspective means determining information (e.g., network information) regarding the networked system based at least mostly on data obtained from sources/devices external to the networked system (e.g., at least a predetermined percentage, such as 80%, 90%, 95%, of the data is obtained from external to the networked system). In some embodiments, analyzing the networked system from the external perspective means determining the network information of the networked system based solely on data obtained from sources/devices external to the networked system, without using any internal knowledge of the networked system. Thus, the network information obtained based on analyzing the networked system from the external perspective often includes only a portion of (and not the entirety of) network information associated with the networked system.

In some embodiments, the vulnerability assessment system may scan the networked system from the external perspective to determine information (e.g., network information) associated with the networked system. The external information that the vulnerability assessment system may obtain based on scanning the networked system may include one or more access points (e.g., open ports) for accessing the networked system, a number of access points per machine accessible from devices external to the networked system, a number of non-standard open ports, one or more services running on the access points, technologies used to provide the services, network certificate data, and the like. Since the information is determined from the external perspective, it is likely that the malicious users may also be able obtain the same (or similar) information and may use the information to access the networked system (e.g., to launch an attack to the networked system).

The vulnerability assessment system may scan the networked system under an active scanning approach or a passive scanning approach. Under an active scanning approach, the vulnerability assessment system may attempt to access the networked system via different access point candidates to determine whether any of the access point candidates are open. For example, the vulnerability assessment system may send communication to the networked system via different ports to determine whether any of the ports are open and attempt to request different services from the networked system via the ports. However, it is unlikely that the malicious users would scan the networked system under the active scanning approach as doing so may inadvertently give notice to the networked system, since the networked system may monitor and may track the origins of such attempts.

As such, the vulnerability assessment system of some embodiments may scan the networked system under the passive scanning approach. Under the passive scanning approach, the vulnerability assessment system may determine the information associated with the networked system through publicly assessible information. For example, the vulnerability assessment system may obtain and analyze reports generated by search engines, third-party scanning services, and the like. Based on the reports, the vulnerability assessment system may determine information such as the type of services provided by the networked system, technologies used by the networked system to provide the services, certificate data, and/or one or more access points that are open for the networked system.

In some embodiments, the vulnerability assessment system may maintain a list of known (or disclosed) vulnerabilities. The known vulnerabilities may be obtained from different sources. As discussed above, certain computer security firms may discover and publish network vulnerabilities. Thus, the vulnerability assessment system may obtain the known network vulnerabilities published by the computer security firms. In some embodiments, the vulnerability assessment system may also monitor communication over the Internet, such as social media sites (e.g., Twitter®, Facebook®, etc.) and/or forums (e.g., Darknet, etc.), to determine any communication that mentions specific network vulnerabilities. It is noted that not all vulnerabilities have similar impact to a particular organization as various factors govern the impact of the vulnerabilities on the particular organization. Exploits (e.g., tools, algorithms, know-how, etc.) for these vulnerabilities are often sold or advertised on the Internet (e.g., social media sites, forums, chat rooms, etc.). As more malicious actors discover these exploits and start using it, the higher the impact is on the organization. So monitoring these Internet sites for discussion about the vulnerabilities can also provide a significant factor for calculating the impact. Furthermore, the vulnerability assessment system may also obtain information regarding vulnerabilities discovered by one or more organizations, such as vulnerabilities discovered by the organization corresponding to the networked system or by other organizations. Since the known vulnerabilities are obtained from different sources, the known vulnerabilities may be applicable to different networked systems generally, and not specific to the networked system.

As such, the vulnerability assessment system of some embodiments may then determine one or more correlations between the known vulnerabilities and the networked system based on the information related to the networked system obtained through the scanning of the networked system from the external perspective. In some embodiments, when a known vulnerability is associated with a particular access point (e.g., a particular open port), the vulnerability assessment system may determine whether the networked system includes the particular access point (e.g., whether any machine within the networked system has the particular port opened) based on the information related to the networked system. When a known vulnerability is associated with a particular service (e.g., web service provided by a particular version of Apache web server), the vulnerability assessment system may determine whether the networked system provides the particular service via one or more access points based on the information (e.g., the external information) related to the networked system. When a known vulnerability is associated with a particular technology (e.g., a border gateway protocol (BGP), etc.), the vulnerability assessment system may determine whether the networked system uses the particular technology based on the information related to the networked system. In some embodiments, the vulnerability assessment system may determine that a known vulnerability is relevant to the networked system when a certain level of correlation is determined between the known vulnerability and the networked system based on the information related to the networked system.

By determining correlations between vulnerabilities and the networked system based on information obtained from the external perspective, the vulnerability assessment system may determine known vulnerabilities that are relevant (e.g., at or above a certain correlation) to the networked system (e.g., known vulnerabilities that malicious users may likely exploit to attack the networked system) and known vulnerabilities that are not relevant (e.g., below a certain correlation) to the networked system (e.g., known vulnerabilities that do not affect the networked system). The organization may then focus its effort on the known vulnerabilities that are determined to be relevant to the networked system and may de-emphasize (or even ignore) the known vulnerabilities that are determined to be irrelevant to the networked system. However, the list of relevant known vulnerabilities may still be large enough that the organization may not be able to address all of them within a predetermined period of time. As such, the vulnerability assessment system of some embodiments may further analyze the list of relevant known vulnerabilities from an internal perspective of the networked system to predict an impact to the organization when each of the relevant known vulnerability is exploited by malicious users to attack the networked system. Since different organizations may configure and use their respective networked systems differently, the same vulnerability may have different impacts for different organizations. Thus, by analyzing the vulnerabilities from the internal perspective of the networked system, the vulnerability assessment system may determine an impact of a vulnerability specific to the organization.

In some embodiments, for each vulnerability in the list of relevant known vulnerabilities, the vulnerability assessment system may analyze the networked system based on the vulnerability to determine an impact to the organization. For example, the vulnerability assessment system may determine an impact of a vulnerability to the organization based on one or more types of data that may be accessed by malicious users, the type(s) of services provided by the networked system that may be interrupted, and/or an estimated duration of time that the service(s) may be interrupted, when a hypothetical attack that exploits the vulnerability of the networked system occurs. In some embodiments, the vulnerability assessment system may also quantify the impact. For example, the vulnerability assessment system may assign a value to each data stored within the networked system. The more sensitive the data is to the organization, the higher the value that is assigned to the data. The vulnerability assessment system may also assign a rate (e.g., a value over a unit of time such as a value per minute) to each service provided by the networked system. Thus, the vulnerability assessment system may calculate an impact value for a vulnerability based on the values assigned to the data that may be accessed by malicious users, the rates assigned to the service(s), and the estimated amount of time that the service(s) may be interrupted when the hypothetical attack on the networked system that exploits the vulnerability occurs.

In some embodiments, in addition to evaluating the impact that each vulnerability may have on the networked system, the vulnerability assessment system may also determine a likelihood that an attack on the networked system based on each of the vulnerabilities will occur. For example, the vulnerability assessment system may determine a likelihood that an attack based on a vulnerability will occur based on a number of factors such as whether a computer tool exists that assists malicious users to exploit the vulnerability, a length of time that the computer tool has been made available, an amount of chatter related to the vulnerability detected, and a number of attacks that exploit the vulnerability within a predetermine period of time.

The vulnerability assessment system may then rank the list of relevant known vulnerabilities based on the impact values and the likelihoods that attacks on the networked system based on the vulnerabilities will occur. The vulnerability assessment system may display, on a device associated with the networked system, the ranking such that the organization may implement patches for the vulnerabilities based on the ranking. In addition, the vulnerability assessment system may re-configure the networked system based on the ranking. Since the organization may not be able to implement computer patches to all of the vulnerabilities on the list within a predetermined period of time, the vulnerability assessment system may re-configure (e.g., adjust) the networked system based on the vulnerabilities for which patches have not been implemented yet. For example, the vulnerability assessment system may remove access to certain data (and/or data storages), close one or more access points (e.g., ports), and/or increase security for accessing one or more services provided by the networked system before the patches are implemented.

FIG. 1 illustrates a system 100 in which the vulnerability assessment system may be implemented according to one embodiment of the disclosure. The system 100 includes a networked system 130, a monitoring platform 145, a user device 110, a social media server 150, and a media server 160 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110 is a device external to the networked system 130. The user device 110, in one embodiment, may be utilized by a user 140 to interact with the networked system 130 over the network 160. For example, the user 140 may be a legitimate user of the networked system 130, and may use the user device 110 to conduct electronic transactions (e.g., browsing a website hosted by the networked system 130, accessing data stored within the networked system 130, log in to an account associated with the networked system, perform an online purchase transaction, perform an electronic payment transaction, etc.) with the networked system 130. In another example, the user 140 may be a malicious user (e.g., a hacker), and may use the user device 110 to obtain information related to the networked system 130 (e.g., by performing an active scanning and/or a passive scanning of the networked system 130), and to launch an attack (e.g., denial of service attack, trojan horse attack, etc.) to the networked system 130 by exploiting one or more vulnerabilities of the networked system 130 based on the obtained information.

The user device 110, in one embodiment, includes a user interface (UI) application 112 (e.g., a web browser, a mobile application, etc.), which may be utilized by the user 140 to conduct electronic transactions (e.g., online payment transactions, etc.) with the networked system 130 over the network 160. The user interface application 112 may include a software program, such as a graphical user interface (GUI), executable by a processor that is configured to interface and communicate with one or more components of the networked system 130 via the network 160.

The user device 110, in various embodiments, may include other applications 116 as may be desired in one or more embodiments of the present disclosure to provide additional features available to the user 140. In one example, when the user 140 is a malicious user, such other applications 116 may include software programs that assist the user 140 to launch an attack to networked systems (e.g., the networked system 130) by exploiting one or more network vulnerabilities. The software programs may be made available by other users on the Internet (e.g., posted on an online hacker forum, etc.), and may be downloaded to and installed on the user device 110 by the user 140. The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers.

Even though only one user device 110 is shown in FIG. 1, it has been contemplated that one or more user devices (each similar to user device 110) may be communicatively coupled with the networked system 130 via the network 160 within the system 100.

In some embodiments, the monitoring platform 145 may implement at least a portion of the vulnerability assessment system and may reside within the networked system 130 or external to the networked system 130. In some embodiments, the monitoring platform 145 may be configured to scan the networked system 130 from an external perspective to obtain information related to the networked system 130. For example, the monitoring platform 145 may perform at least one of an active scanning or passive scanning as described herein of the networked system 130 to obtain information related to the networked system 130, including for example, one or more access points (e.g., open ports) for accessing the networked system 130, a number of access points per machine accessible from devices external to the networked system 130, a number of non-standard open ports of the networked system 130, one or more services provided by the networked system 130 and running on the access points, technologies used by the networked system 130 to provide the services, network certificate data associated with the networked system 130, and the like.

The networked system 130, in one embodiment, may be maintained by an organization (e.g., an online service provider), which may provide online services (e.g., accessing data, performing payment transactions, etc.) to users (e.g., the user 140) external to the networked system 130. In one example, the networked system 130 may be maintained by PayPal®, Inc., of San Jose, Calif., USA, for providing online payment services to external users. As such, the networked system 130 may include a web server 134 for hosting a website of the organization, through which external users may use devices (e.g., the user device 110) to access services (e.g., information, online services, etc.) provided by the organization using a web browser via a web protocol (e.g., a hypertext transfer protocol (HTTP), etc.). The networked system 130 may also include a mobile application server 136 for communicating with mobile applications installed on user devices (e.g., the user device 110). In some embodiments, external users (e.g., the user 140), may use a mobile application installed on the user device 110 to access the services provided by the organization via a mobile communication protocol (e.g., a representational state transfer (REST) protocol). The networked system 130 may also include one or more other communication server(s) 138 (e.g., a file transfer protocol (FTP) server, etc.) for communicating with external devices using one or more communication protocols (e.g., an FTP protocol, a border gateway protocol (BGP), etc.).

In various embodiments, the networked system 130 may include a vulnerability assessment module 132 that implements at least a portion of the vulnerability assessment system as discussed herein. The vulnerability assessment module 132 is configured to obtain a list of known vulnerabilities that have been discovered and/or published by the organization and/or other organizations, such as computer security firms/agencies, and determine correlations between one or more known vulnerabilities and the networked system 130 based on the information obtained by the monitoring platform 145. As discussed herein, the known vulnerabilities that have correlations above a certain threshold with the networked system 130 (e.g., relevant known vulnerabilities) may be further analyzed by the vulnerability assessment module 132 to determine the impacts that these vulnerabilities may have on the networked system 130. For example, the vulnerability assessment module 132 may analyze the networked system 130 from an internal perspective to determine the impacts each of the relevant known vulnerabilities may have on the networked system 130 based on factors such as the types of data that may be accessible by malicious users, the types of services that may be interrupted, a duration of the interruptions, and the like, based on a potential attack that exploits the vulnerability.

In some embodiments, the vulnerability assessment module 132 may also monitor communication external to the networked system 130 related to vulnerabilities to determine a likelihood that an attack on the networked system 130 based on the vulnerabilities will occur. For example, the vulnerability assessment module 132 may monitor activities on one or more social medial websites (e.g., Facebook®, Twitter®, etc.) and/or activities on one or more forums used by malicious users, computer hackers, and the like. Specifically, the vulnerability assessment module 132 may communicate with the social media server 150 to determine an amount of activities (e.g., the number of posts made) related to the relevant known vulnerabilities generated by members of a social media site. The vulnerability assessment module 132 may also communicate with the media server 160 to determine an amount of activities (e.g., the number of posts made) related to the relevant known vulnerabilities generated by members of a forum site.

The vulnerability assessment module 132 may then rank the relevant known vulnerabilities based on the impact and the likelihood, and may perform security actions based on the ranking. For example, the vulnerability assessment module 132 may re-configure the networked system 130 based on the ranking according to various embodiments of the disclosure.

Figure 2:
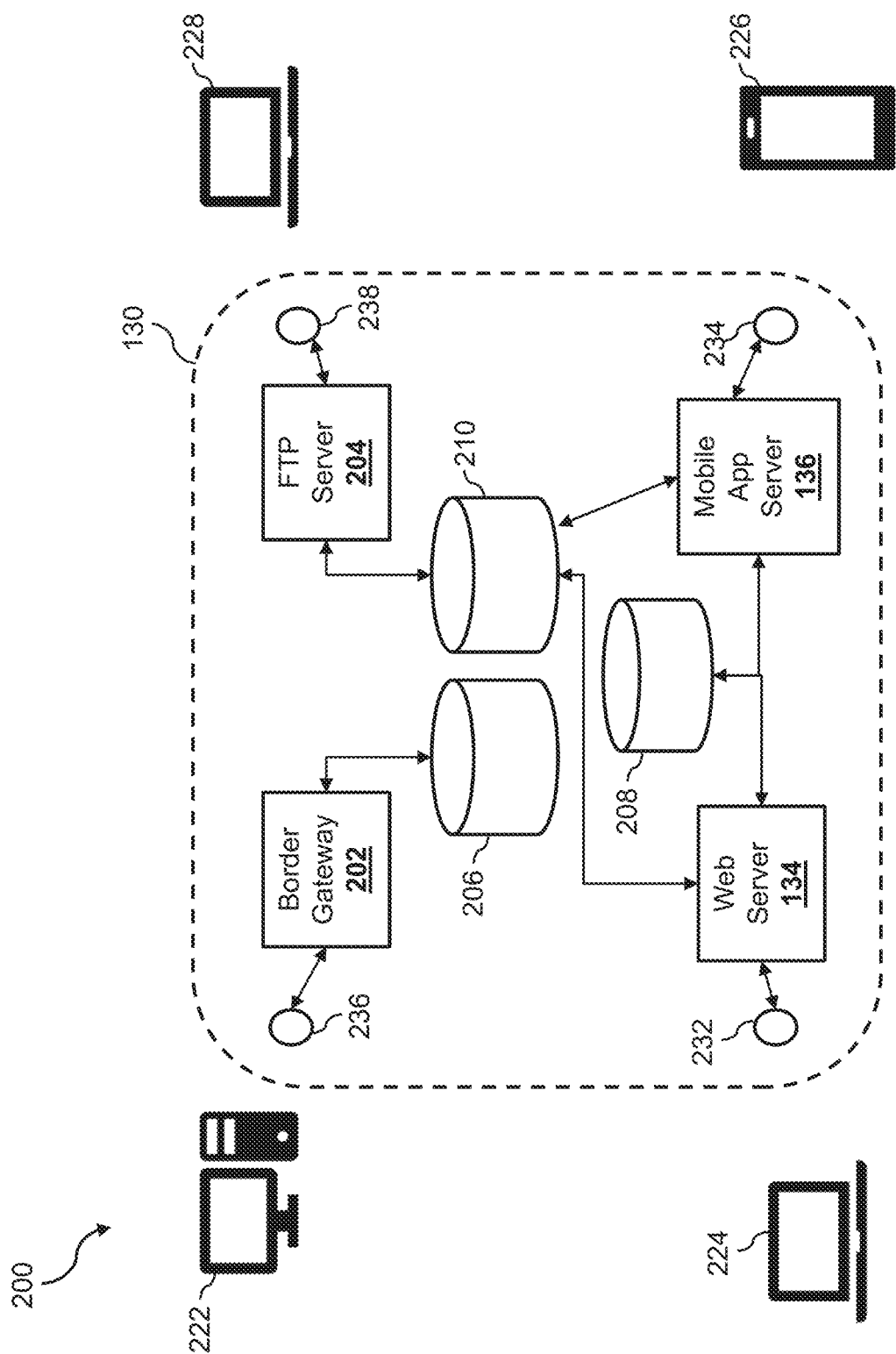
FIG. 2 is a block diagram illustrating a networked system according to an embodiment of the present disclosure.

FIG. 2 illustrates an example of a networked system (e.g., the networked system 130) according to an embodiment of the disclosure. In some embodiments, the networked system 130 may include multiple devices associated with an organization that are connected to form a network of devices. As shown in the figure, the networked system 130 includes the web server 134, the mobile application server 136, a border gateway 202, and an FTP server 204. The networked system 130 may also include multiple data storages 206-210 for storing a variety of data. Each of the data storages 206-210 may include non-transitory memory for storing the data, and may be implemented using one or more data storage schemes such as a file system, a relational database system, and/or an unstructured database system, etc.

Some of the components within the networked system 130 may be connected to each other. For example, as shown in the figure, both the web server 134 and the mobile application server 136 may be connected to the data storage 208. The data storage 208, in some embodiments, may store account information related to accounts of users of the networked system 130, such as authentication data (e.g., usernames, passwords, etc.), transaction history data (e.g., dates of transactions, transaction amounts, parties associated with transactions, etc.), interaction data (e.g., which pages that the user has visited, duration of time that the user spends on each page, etc.), and state information (e.g., a particular state that a user is in within a particular workflow, such as an account registration workflow, a payment transaction workflow, etc.). The web server 134 and the mobile application server 136 may enable users external to the networked system 130 to interact with and access services provided by the networked system 130 via a web interface (e.g., the user browsing a website hosted by the web server 134 using a web browser) and a mobile application interface (e.g., the user interacting with a mobile application installed on a user device), respectively. In some embodiments, the web server 134 and the mobile application server 136 may provide the same services or different services to the users, such as registering for a user account, accessing data stored within the networked system 130, conducting payment transactions, performing purchases of items, etc. Thus, connecting both the web server 134 and the mobile application server 136 to the data storage 208 enables the web server 134 and the mobile application server 136 to access the same data associated with the user accounts, such that the networked system 130 may offer the same experience to the users regardless of the interface the users choose to use to interact with the networked system 130.

The data storage 210 may store data different from the data stored in the data storage 208. For example, the data storage 210 may store inventory data such as inventory type, and a quantity and a price of each inventory that are in possession of the organization. As shown, both of the web server 134 and the mobile application server 136 are connected to the data storage 210 so that the web server 134 and the mobile application server 136 may access and present the information from the data storage 204 to users via their respective interfaces. In addition to the web server 134 and the mobile application server 136, the networked system 130 also includes an FTP server 204 that is connected to the data storage 210. In some embodiments, the FTP server 204 may enable external users to access inventory data stored in the data storage 210 via a third interface (e.g., an FTP command line interface).

In some embodiments, the data storage 206 may store highly sensitive data for the organization (e.g., employees' identification and health data, etc.). The organization may only allow users associated with the organization (e.g., employees of the organization) to access the data store in the data storage 206. However, in order to enable employees who use devices located outside of the networked system 130 to access the data stored in the data storage 206, the networked system 130 includes the border gateway 202 to facilitate data access of the data stored in the data storage 206 by external devices. For security reasons, the data storage 206 is not connected to any other devices that provide external accesses, such as the web server 134, the mobile application server 136, and the FTP server 204.

Each of the devices of the networked system that provide external access to the networked system 130 may have an Internet Protocol (IP) address accessible by external devices and may also configure an access point through which communication with external devices is transmitted. For example, the web server 134 may configure an access point 232 (e.g., an open port 80 of the web server 134) for facilitating HTTP communication with external devices, such as an external device 224. Thus, the external device 224 may send HTTP requests to the IP address associated with the web server 134 through port 80 of the web server 134 to access the website hosted by the web server 134.

The mobile application server 136 may configure another access point 234 (e.g., an open port 443 of the mobile application server 136) for facilitating REST communication with mobile applications installed on external devices, such as an external device 226. The access point 235 enables the mobile application installed on the external device 226 to access services provided by the networked system 130 by sending REST communication to the IP address associated with the mobile application server 136 through port 443 of the mobile application server 136. The FTP server 204 may configure yet another access point 238 (e.g., an open port 21 of the FTP server 204) for facilitating FTP communication with external devices, such as an external device 228, such that the external device 228 may access data stored in the data storage 210 by sending FTP commands to the IP address associated with the FTP server 204 through port 21 of the FTP server 204. The border gateway 202 may configure yet another access point 236 (e.g., an open port 179 of the border gateway 202) for facilitating BGP communication with external devices, such as an external device 222, such that the external device 222 may access the data stored in the data storage 206 by sending BGP communication to the IP address associated with the border gateway 202 through port 179 of the border gateway 202.

Figure 3:
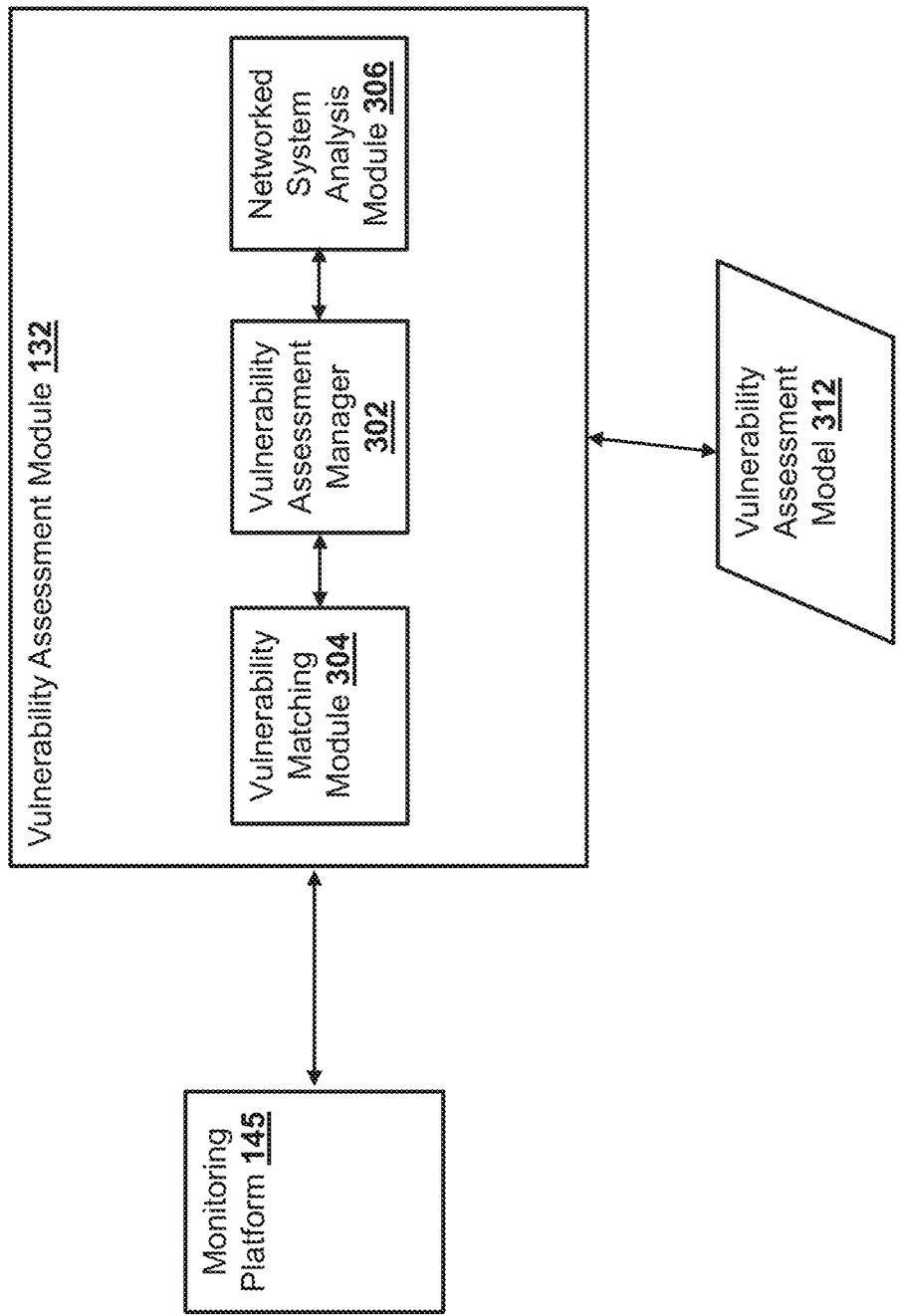
FIG. 3 is a block diagram illustrating a vulnerability assessment module according to an embodiment of the present disclosure.

In some embodiments, the vulnerability assessment module 132, together with the monitoring platform 145, may assess vulnerabilities of the networked system 130 by analyzing the networked system 130 from both an external perspective and an internal perspective. FIG. 3 illustrates a block diagram of the vulnerability assessment module 132 according to one embodiment. As shown, the vulnerability assessment module 132 of some embodiments may include a vulnerability assessment manager 302, a vulnerability matching module 304a networked system analysis module 306, and an impact assessment module 308. In some embodiments, the vulnerability assessment manager 302 may obtain a list of known vulnerabilities. For example, the vulnerability assessment manager 302 may obtain known vulnerabilities from different sources, such as computer security firms/agencies that discover and publish network vulnerabilities, government agencies, the organization associated with the networked system 130, and other organizations.

The monitoring platform 145 may scan the networked system 130 from an external perspective. For example, the monitoring platform 145 may perform a passive scanning of the networked system 130 to generate network information associated with the networked system 130. The network information may include one or more access points for accessing the networked system 130, one or more services provided by the networked system 130, the type of services that are provided by the networked system 130, security certificate data associated with the networked system 130, etc. The monitoring platform 145 may provide the generated network information to the vulnerability assessment manager 302. The vulnerability assessment manager 302 may use the vulnerability matching module 304 to determine correlations between one or more of the known vulnerabilities and the networked system 130 based on the obtained network information. The vulnerability assessment manager 302 may determine that the known vulnerabilities having correlations with the networked system 130 are relevant to the networked system 130, and that the known vulnerabilities having no correlations with the networked system 130 are not relevant (or less relevant) to the networked system 130. Such determinations can also be based on correlations above or below a certain threshold, including zero or no correlation.

The vulnerability assessment manager 302 may use the networked system analysis module 306 to analyze the networked system 130 from an internal perspective to determine an impact of each of the relevant known vulnerabilities on the networked system 130. For example, the networked system analysis module 306 may determine internal information of the networked system 130, which may include, for each vulnerability, the type of data that may be accessible, the type of service that may be interrupted, and/or the duration of the interruption when the vulnerability is exploited. Furthermore, the networked system analysis module 306 may also determine, for each vulnerability, the likelihood that attacks based on exploiting the vulnerability will occur.

The vulnerability assessment manager 302 may then rank the relevant known vulnerabilities based on the determined impact and likelihood of the vulnerabilities. The vulnerability assessment manager 302 may perform one or more actions to the networked system 130 based on the ranking.

Figure 4:
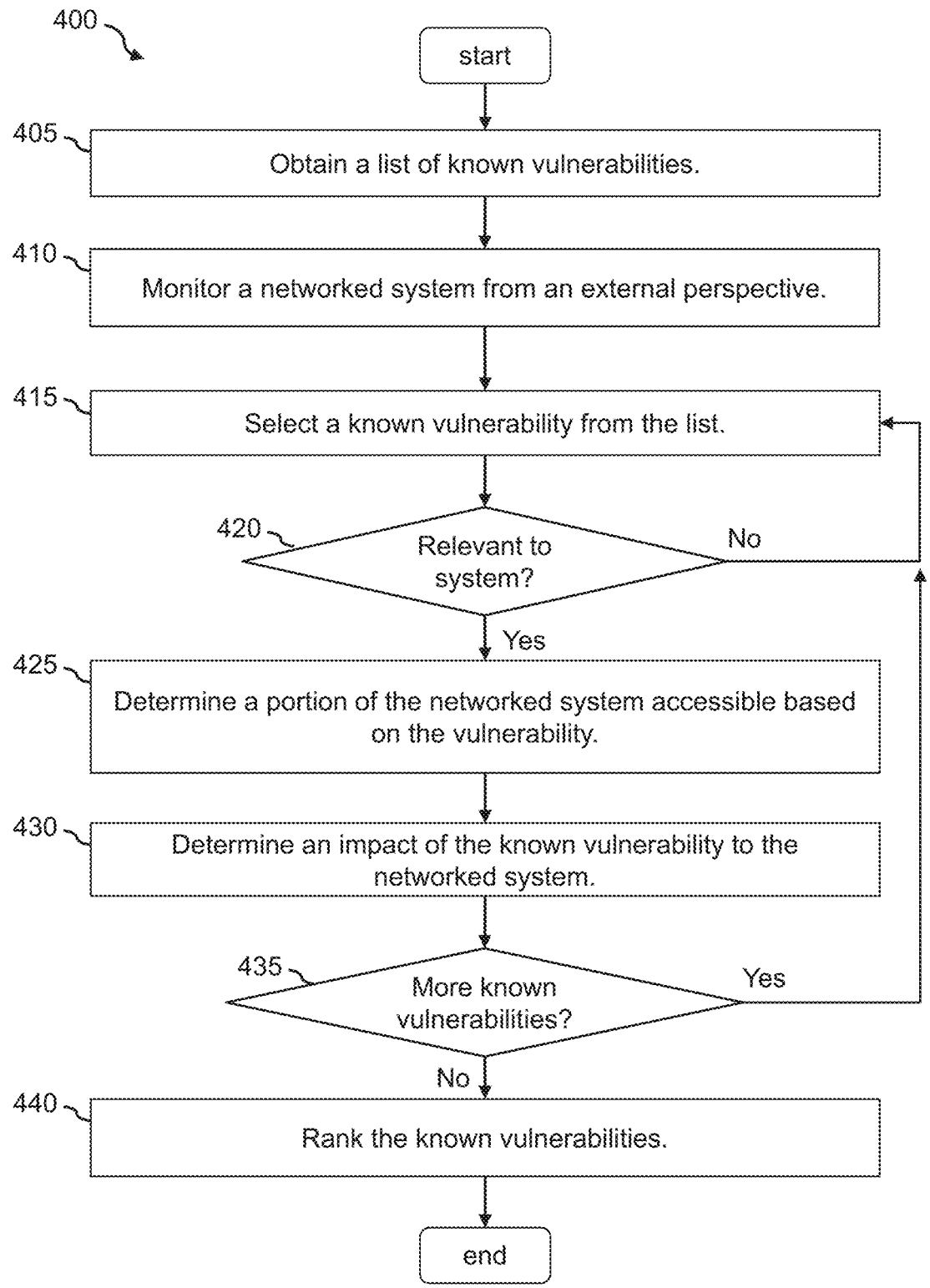
FIG. 4 is a flowchart showing a process of assessing vulnerabilities of a networked system according to an embodiment of the present disclosure.

FIG. 4 illustrates a process 400 for assessing vulnerabilities of a networked system according to an embodiment of the disclosure. In some embodiments, the process 400 may be performed by the vulnerability assessment module 132 and the monitoring platform 145. The process 400 begins by obtaining (at step 405) a list of known vulnerabilities. As discussed herein, networked systems (especially those that provide external access via one or more access points) may have vulnerabilities, which may be exploited by malicious computer users (e.g., hackers) to perform unauthorized actions (e.g., attacks) to the networked systems. Some of the vulnerabilities may be associated with third-party tools that provide services for an organization (e.g., a web server, a file transfer server, a mobile application server, etc.). In addition, some of the vulnerabilities may be associated with the one or more access points (e.g., ports) through which external devices may access the networked system. Further yet, some of the vulnerabilities may be associated with the inherent design of the computer network (e.g., lack of security protocols between data storage that stores sensitive data and the access points).

It has been reported that most of the attacks on networked systems have been conducted by exploiting vulnerabilities that have been disclosed (e.g., published) to the public. As such, the vulnerability assessment manager 302 of some embodiments may obtain vulnerabilities that have been disclosed in the public. The vulnerability assessment manager 302 may obtain information regarding disclosed vulnerabilities from different sources, such as computer security firms/agencies that discover and publish network vulnerabilities, government agencies, the organization associated with the networked system 130, and other organizations. As discussed above, certain computer security firms or agencies may discover and publish network vulnerabilities. Thus, the vulnerability assessment manager 302 may obtain information regarding network vulnerabilities disclosed by the computer security firms or agencies. In some embodiments, the vulnerability assessment manager 302 may also monitor communication over the Internet, such as social media sites (e.g., Twitter®, Facebook®, etc.) and/or forums (e.g., Darknet, etc.), to determine any communication that mentions specific network vulnerabilities. As such, the vulnerability assessment manager 302 may communicate with one or more social media servers 150 to determine any vulnerabilities mentioned in posts generated by members of the social media sites. The vulnerability assessment manager 302 may also communicate with one or more other media servers 160 to determine any vulnerabilities mentioned in posts generated by members of the forum sites.

Furthermore, the vulnerability assessment manager 302 may also obtain information regarding vulnerabilities discovered by one or more organizations, such as vulnerabilities discovered by the organization corresponding to the networked system 130 or by other organizations. Since the known vulnerabilities are obtained from different sources, the known vulnerabilities may be applicable to different networked systems generally, and not specific to the networked system. As such, the vulnerability assessment manager 302 may analyze the networked system 130 to determine which of the known vulnerabilities are relevant to the networked system 130.

At step 410, the process 400 monitors (or analyzes) a networked system from an external perspective. Since malicious users (e.g., hackers) do not have (or have limited) internal knowledge of the networked system 130, they often rely on information and tools that they may obtain from sources external to the networked system 130 to determine how to attack the networked system 130. Thus, by analyzing the networked system 130 from the external perspective, the vulnerability assessment manager 302 may predict how a malicious user would potentially plan to attack the networked system 130. In some embodiments, the monitoring platform 145 may scan the networked system 130 from the external perspective to determine network information associated with the networked system 130. The networked information that the monitoring platform 145 may obtain based on scanning the networked system 130 may include information related to one or more access points (e.g., open ports) for accessing the networked system 130, a number of access points per machine (e.g., device) accessible from devices external to the networked system 130, a number of non-standard access points (e.g., non-standard open ports), one or more services provided by the networked system 130 and running on the access points, technologies used by the networked system 130 to provide the services, network certificate data, and the like. Since the information is determined from the external perspective, it is likely that the malicious users may also be able obtain the same (or similar) information and may use the information to access the networked system (e.g., to launch an attack to the networked system).

In some embodiments, the monitoring platform 145 may scan the networked system 130 under an active scanning approach or a passive scanning approach. Under an active scanning approach, the monitoring platform 145 may attempt to access the networked system 130 via different access point candidates to determine whether any of the access point candidates are open. For example, the monitoring platform 145 may send communication to the networked system 130 via different ports (e.g., ports that are associated with different services) to determine whether any of the ports are open and attempt to request different services from the networked system 130 via the ports. However, scanning the networked system 130 under the active scanning approach may inadvertently give notice to the networked system 130, since the networked system 130 may monitor and may track the origins of such attempts. Thus, it is unlikely that the malicious users would scan the networked system 130 under the active scanning approach. Instead, the malicious users would more likely to obtain network information of the networked system 130 based on a passive scanning approach.

As such, in some embodiments, the monitoring platform 145 may scan the networked system 130 under the passive scanning approach. Under the passive scanning approach, the monitoring platform 145 may determine the network information associated with the networked system 130 through publicly assessible information. For example, the monitoring platform 145 may obtain and analyze reports generated by search engines, third-party scanning services, and the like. Based on the reports, the monitoring platform 145 may determine network information such as the type of services provided by the networked system 130, technologies used by the networked system 130 to provide the services, certificate data, and/or one or more access points that are open for the networked system 130. The monitoring platform 145 may transmit the network information to the vulnerability assessment manager 302.

Figure 5:
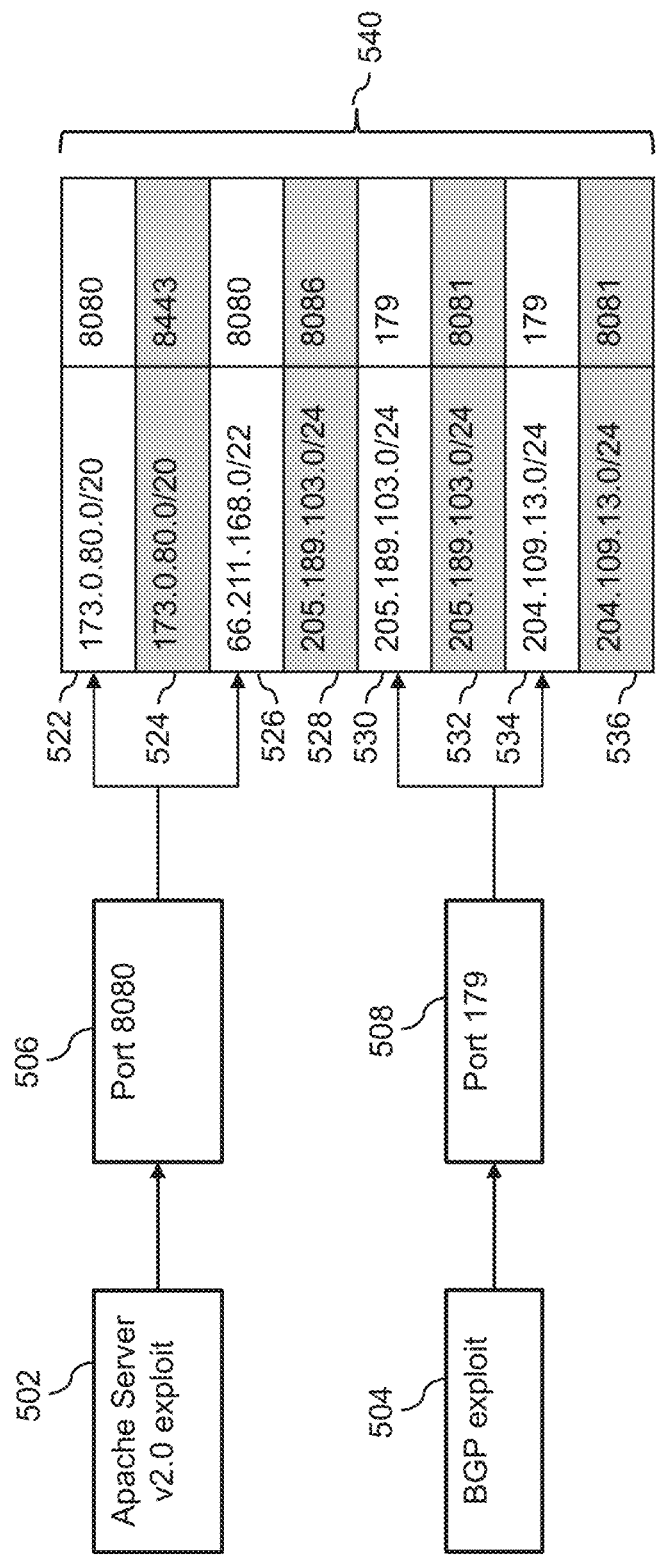
FIG. 5 illustrates correlations between vulnerabilities and network information of a networked system according to an embodiment of the present disclosure.

FIG. 5 illustrates example network information 540 generated by the monitoring platform 145. In some embodiments, the network information 540 may represent only a portion of the network information generated by the monitoring platform 145. As shown, the network information 540 shows multiple rows of network information 522-546. Each row of network information 522-546 includes an IP address (or an IP address range) and a port number, indicating that one or more devices within the networked system 130 having the IP address (or the IP address range) have the corresponding port number open. For example, the row 522 indicates that one or more devices within the networked system 130 are associated with the IP address range 173.0.80.0 to 173.0.80.20 and have the port 8080 open. The row 524 indicates that the one or more devices associated with the IP address range 173.0.80.0 to 173.0.80.20 also have the port 8443 open. The row 526 indicates that one or more devices within the networked system 130 are associated with the IP address range 66.211.168.0 to 66.211.168.22 and have the port 8080 open. The rows 528-532 indicate that one or more devices within the networked system 130 are associated with the IP address range 205.189.103.0 to 205.189.103.24 and have the ports 8086, 179, and 8081 open. The rows 528-532 indicate that one or more devices within the networked system 130 are associated with the IP address range 205.189.103.0 to 205.189.103.24 and have the ports 8086, 179, and 8081 open. In some embodiments, the monitoring platform 145 is configured to perform such a scanning (e.g., an active scanning, a passive scanning, etc.) of the networked system 130 multiple times over a period of time (e.g., periodically such as every week, every month, etc.) to capture updated network information of the networked system 130.

In some embodiments, the vulnerability assessment manager 302 may discover additional vulnerabilities based on the network information obtained from the monitoring platform 145. For example, when the vulnerability assessment manager 302 determines that the network information 540 indicates a new set of IP addresses with multiple open ports are associated with the networked system 130 that were not associated with the networked system 130 before (the new set of IP addresses are indicated in first networked information generated by the monitoring platform 145 at a first time instance but were not included in second network information generated by the monitoring platform 145 at a second time instance prior to the first time instance), the vulnerability assessment manager 302 may determine that the organization has opened a new physical facility. A new facility for an organization usually introduces vulnerabilities to the networked system as security protocols may not have been fully in place when the facility is just opened. Thus, the vulnerability assessment manager 302 may create one or more vulnerabilities associated with the new set of IP addresses and their open ports, and may add the one or more vulnerabilities to the list of known vulnerabilities.

In another example, the vulnerability assessment manager 302 may determine trends or characteristics of the networked system 130 based on a history of network information obtained from the monitoring platform 145 (e.g., network information associated with the networked system 130 that has been generated over a period of time such as several months, a year, 5 years, etc.). The trends or characteristics may include a use of a particular version of IP protocol (e.g., IPv4, etc.), a set of ports that are usually open or not open, etc. Thus, when the vulnerability assessment manager 302 discovers any network attribute that is out of the ordinary (e.g., deviates from the trends or characteristics beyond a certain threshold), the vulnerability assessment manager 302 may create a vulnerability associated with that network attribute. In a particular example, the vulnerability assessment manager 302 may determine that the networked system 130 has been using IPv4 protocol. When the vulnerability assessment manager 302 discovers from the network information that one or more IP addresses associated with IPv6 have been used by the networked system 130, the vulnerability assessment manager 302 may identify those one or more IP addresses as vulnerabilities of the networked system 130 and add the vulnerabilities to the list of known vulnerabilities. In another example, when the vulnerability assessment manager 302 determines from the network information that a particular open port (e.g., port 31) has just been opened for one or more devices within the networked system 130, where the networked system 130 never had that particular port open before, the vulnerability assessment manager 302 may identify those devices with port 31 open as new vulnerabilities and add these new vulnerabilities to the list of known vulnerabilities.

The vulnerability assessment manager 302 may then determine whether each of the known vulnerabilities is relevant to the networked system 130 based on the network information obtained from the monitoring platform 145.

Thus, the process 400 selects (at step 415) a known vulnerability from the list of known vulnerabilities and determines (at step 420) whether the selected vulnerability is relevant to the networked system. In some embodiments, the vulnerability assessment manager 302 may determine that a vulnerability is relevant to the networked system 130 when there is a correlation (above a certain threshold) between the vulnerability and the networked system 130 based on the network information of the networked system 130 obtained from the monitoring platform 145. As discussed herein, since the known vulnerabilities are obtained from different sources, the known vulnerabilities may be applicable to different networked systems generally, and not specific to the networked system 130. For example, the known vulnerability may be associated with a particular access point (e.g., a particular port). The vulnerability assessment manager 302 may then determine that the known vulnerability is relevant to the networked system 130 when the network information indicates that one or more devices within networked system has the particular port open, and may determine that the known vulnerability is not relevant to the networked system 130 when the network information indicates that none of the devices within the network system has the particular port open.

In another example, the known vulnerability may be associated with a particular service (e.g., an FTP data access service). The vulnerability assessment manager 302 may then determine that the known vulnerability is relevant to the networked system 130 when the network information indicates that one or more devices within networked system provides the particular service, and may determine that the known vulnerability is not relevant to the networked system 130 when the network information indicates that none of the devices within the network system provides the particular service.

Referring back to FIG. 5, the network information 540 may be used by the vulnerability matching module 304 to determine correlations between known vulnerabilities and the networked system 130. Specifically, FIG. 5 shows two known vulnerabilities 502 and 504 obtained by the vulnerability assessment manager 302. As shown, the known vulnerability 502 is associated with an exploit (e.g., a bug) of an Apache® web server version 2.0. The vulnerability matching module 304 may determine that the Apache® web server version 2.0 uses an access point 506 (e.g., port 8080) for communication with external devices. The vulnerability matching module 304 may then analyze the network information 540 to determine if a correlation above a certain threshold exists between the network system 130 and the vulnerability 502. In this example, the vulnerability matching module 304 found that one or more devices within the networked system 130 have the port 8080 open based on rows 522 and 526 of the network information 540, indicating that the one or more devices may possibly be running the Apache® web server version 2.0. Thus, the vulnerability matching module 304 may determine that the known vulnerability 502 is relevant to the networked system 130 based on the correlation between the vulnerability 502 and rows 522 and 526.

The vulnerability matching module 304 may determine that the known vulnerability 504 is associated with an exploit (e.g., a bug) of a border gateway protocol (BGP). The vulnerability matching module 304 may also determine that communication using BGP is generally through an access point 508 (e.g., port 179). Thus, the vulnerability matching module 304 may then analyze the network information 540 to determine if a correlation above a certain threshold exists between the network system 130 and the vulnerability 504. In this example, the vulnerability matching module 304 found that one or more devices within the networked system 130 have the port 179 open based on rows 530 and 534 of the network information 540, possibly for facilitating communication with external devices using BGP. Thus, the vulnerability matching module 304 may determine that the known vulnerability 504 is relevant to the networked system 130 based on the correlation between the vulnerability 504 and the rows 530 and 534.

When it is determined that the selected vulnerability is not relevant to the networked system, the process 400 reverts back to the step 415 to select another known vulnerability from the list of known vulnerabilities. However, if it is determined that the selected vulnerability is relevant to the networked system, the process 400 determines (at step 425) a portion of the networked system accessible based on the vulnerability and determines (at step 430) an impact of the known vulnerability to the networked system. For example, the networked system analysis module 306 may analyze the networked system 130 based on the vulnerability and may determine an impact of the vulnerability to the organization. In some embodiments, the networked system analysis module 306 may determine an impact of a vulnerability based on a set of data stored within the networked system that may be accessed by malicious users and/or a set of services provided by the networked system that may be affected based on an attack to the networked system 130 by exploiting the vulnerability.

In an example where the vulnerability (e.g. the vulnerability 502) is associated with a particular web server used by the networked system (e.g., the web server 134), the networked system analysis module 306 may traverse the networked system 130 from the access point 232 associated with the web server 134, and may identify data and/or services that the networked system analysis module 306 may access. Referring back to FIG. 2, from the access point 232 (e.g., port 80 of the web server 134), the network system analysis module 306 may traverse through the web server 134, the data storage 208, and the data storage 210, and thus, may access the web services provided by the web server 134 and the data (user account data, inventory data, etc.) stored in the data storage 208 and the data storage 210. The networked system analysis module 306 may then determine an impact of the vulnerability to the organization based on the type of data and the type of services that are accessible based on the vulnerability 502.

In some embodiments, the networked system analysis module 306 may quantify the impact of the vulnerability to the organization. To do so, the networked system analysis module 306 of some embodiments may assign a value to each data that is stored in the networked system 130. The value assigned to each data may depend on the data type and/or how important the data is to the organization. For example, the networked system analysis module 306 may assign a first value (e.g., 6) to each piece of user account data stored in the data storage 208, may assign a second value (e.g., 2) to each piece of inventory data stored in the data storage 210, and may assign a third value (e.g., 20) to each piece of data stored in the data storage 206. Since the networked system analysis module 306 determines that only data from the data storages 208 and 210 are accessible based on the vulnerability, the networked system analysis module 306 may calculate a data impact value based on the values assigned to the data stored in the data storages 208 and 210 and the amount of respective data stored in the data storages 208 and 210. For example, if there is a total of 100 records of user account data stored in the data storage 208 and 50 records of inventory data stored in the data storage 210, the networked system analysis module 306 may determine the data impact value to be 700 (first value×100+second value× 50).

The networked system analysis module 306 may also assign values to different services offered by the networked system 130. For example, the networked system analysis module 306 may assign a fourth value (e.g., 5) to its web service, a fifth value (e.g., 3) to its mobile application service, a sixth value (e.g., 2) to its FTP service, and a seventh value (e.g., 10) to its border gateway service. The networked system analysis module 306 may then calculate a service impact value for the vulnerability 502 based on the value assigned to the web service and an estimated amount of time for which the web service may be interrupted. If the networked system analysis module 306 determines that it will take 30 minutes for the web service to be restored after an attack, the networked system analysis module 306 may determine the service impact value to be 150 (fourth value× 30) for the vulnerability 502. The networked system analysis module 306 may determine a total impact value of 850 for the vulnerability 502.

In an example where the vulnerability (e.g. the vulnerability 504) is associated with a particular protocol used by the networked system (e.g., the BGP protocol), the networked system analysis module 306 may traverse the networked system 130 from the access point 236 associated with the border gateway 202 that uses the BGP protocol, and may identify data and/or services that the networked system analysis module 306 may access. As shown in FIG. 2, from the access point 236 (e.g., port 179 of the border gateway 202), the network system analysis module 306 may traverse the border gateway 202 and the data storage 206, and thus, may access the communication service provided by the border gateway 202 and the data (highly sensitive for the organization) stored in the data storage 206. The networked system analysis module 306 may then determine an impact of the vulnerability 504 to the organization based on the type of data and the type of services that are accessible based on the vulnerability 504.

In some embodiments, the networked system analysis module 306 may quantify the impact of the vulnerability 506 to the organization. For example, the networked system analysis module 306 may calculate a data impact value based on the values (e.g., the third value) assigned to the data stored in the data storage 206 and the amount of respective data stored in the data storages 206 and 210. If the networked system analysis module 306 determines that there is a total of 200 records of sensitive data stored in the data storage 206, the networked system analysis module 306 may determine the data impact value to be 4000 (third value× 200).

The networked system analysis module 306 may also calculate a service impact value for the vulnerability 504 based on the value assigned to the BGP service and an estimated amount of time for which the BGP service may be interrupted. If the networked system analysis module 306 determines that it will take 20 minutes for the web service to be restored after an attack, the networked system analysis module 306 may determine the service impact value to be 200 (the seventh value×20) for the vulnerability 504. The networked system analysis module 306 may determine a total impact value of 4200 for the vulnerability 504.

In addition to determining an impact for the vulnerability, the networked system analysis module 306 of some embodiments may also determine a likelihood that an attack on the networked system 130 based on the vulnerability will occur. In some embodiments, the networked system analysis module 306 may determine the likelihood based on a number of factors, including whether a computer tool exists that assists malicious users to exploit the vulnerability, a length of time that the computer tool has been made available, a number of websites (e.g., social media, forums, paste sites, etc.) where the computer tool has been distributed or advertised, an amount of activities related to the vulnerability detected, and a number of attacks that exploit the vulnerability within a predetermine period of time. Thus, the networked system analysis module 306 may communicate with the social media server 150 and/or the media server 160 to detect any postings regarding the vulnerability and computer tools for exploiting the vulnerability.

Furthermore, the networked system analysis module 306 may use a vulnerability assessment model 312 (e.g., a machine learning model) to determine the likelihood based on those factors. The vulnerability assessment model 312 may be trained based on historic data of previous attacks and configured to output a value indicating a likelihood of an attack based on the vulnerability will occur.

In some embodiments, the vulnerability assessment model 312 is configured to receive the factors and also the impact value as inputs and to output a score indicating a severity of the vulnerability to the organization. As such, the vulnerability assessment model 312 may produce a high severity score (above a certain threshold) for a vulnerability when the impact of the vulnerability is great (above a certain threshold) to the organization and the likelihood of an attack on the networked system 130 based on the vulnerability is high (above a certain threshold). Conversely, the vulnerability assessment model 312 may produce a low severity score (below a certain threshold) for a vulnerability when the impact of the vulnerability is small (below a certain threshold) to the organization and the likelihood of an attack on the networked system 130 based on the vulnerability is low (below a certain threshold).

Referring back to FIG. 4, once a severity score is generated for the vulnerability, the process 400 determines (at step 435) if there more known vulnerabilities in the list of known vulnerabilities. If it is determined that there are more known vulnerabilities in the list, the process 400 reverts back to the step 415 to select another known vulnerability from the list and perform the steps 420-430 for the selected vulnerability. If it is determined that there are no more vulnerabilities left in the list, the process proceeds to step 400 to rank the known vulnerabilities that are relevant to the networked system. For example, the vulnerability assessment manager 302 may rank the relevant known vulnerabilities based on their respective severity scores. In some embodiments, the vulnerability assessment manager 302 may present the ranking of the vulnerabilities to a device associated with the networked system 130 or transmit the ranking of the vulnerabilities to other modules so that the vulnerabilities can be addressed based on the ranking. For example, the organization may decide to address (e.g., implement a computer patch to remove the vulnerabilities) the vulnerabilities in an order based on the ranking such that the vulnerabilities having higher severity scores (e.g., have greater impact to the organization, have higher likelihood of being exploited in an attack, or both) may be addressed before the vulnerabilities having lower severity scores.

Since the organization may not be able to address at least some of the vulnerabilities within a period of time (e.g., a month after the vulnerabilities are disclosed publicly, etc.), the vulnerability assessment manager 302 may improve the security of the networked system 130 before the vulnerabilities are addressed (e.g., before computer patches are implemented). In some embodiments, the vulnerability assessment manager 302 may re-configure the networked system 103 based on the ranking. For example, the vulnerability assessment manager 302 may monitor the progress of implementing the computer patches of the ranked vulnerabilities and may re-configure (e.g., adjust) the networked system 130 based on the vulnerabilities for which patches have not been implemented yet. In one instance, the vulnerability assessment system may remove access to certain data and/or data storages (e.g., the data and/or data storages that may be accessed in an attack based on the vulnerability), close one or more access points (e.g., ports), and/or increase security for accessing one or more services provided by the networked system before the patches are implemented. The vulnerability assessment manager 302 may then reverse the adjustment when the vulnerability assessment manager 302 determines that a computer patch has been implemented to address the vulnerability.

Figure 6:
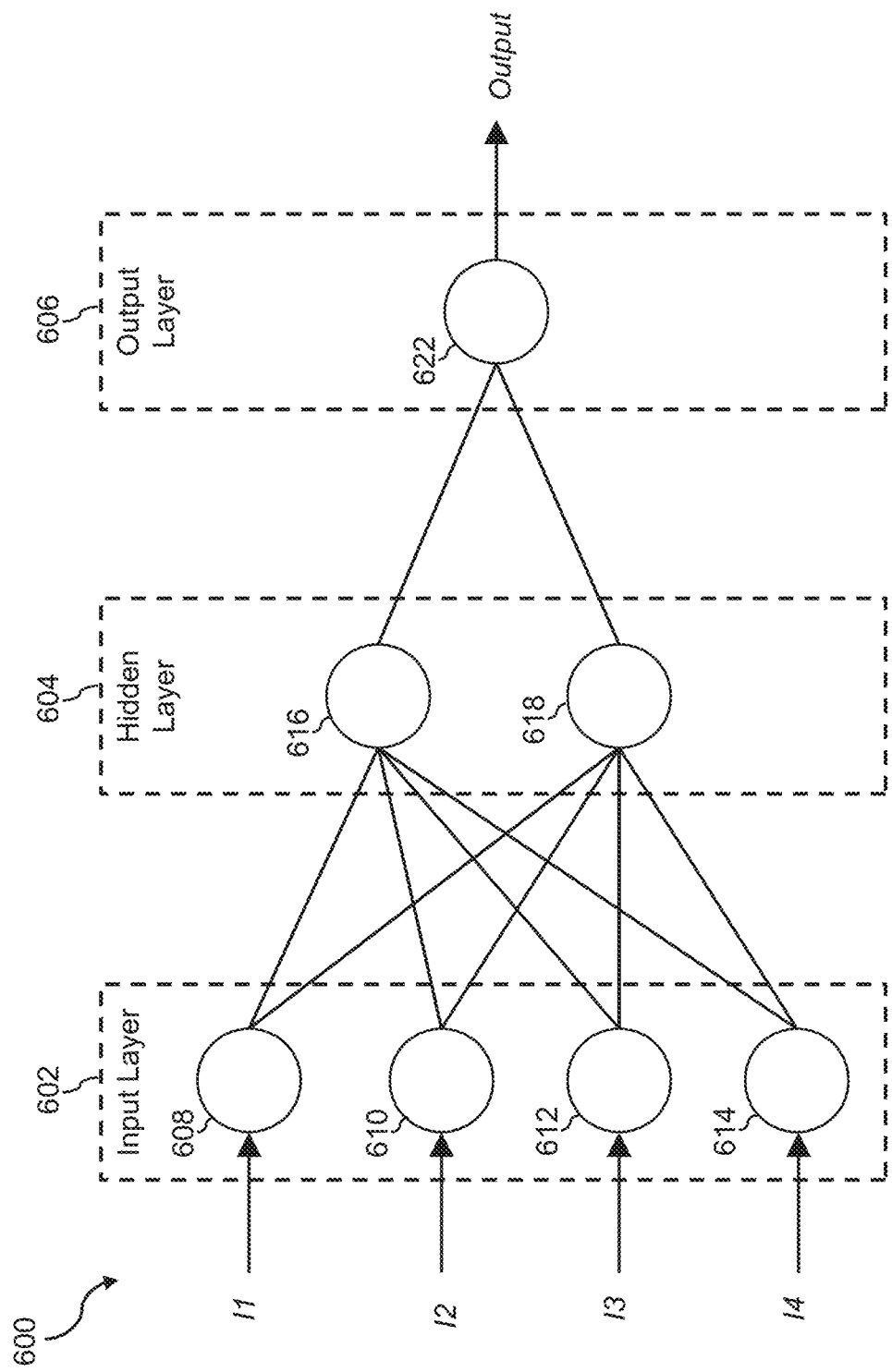
FIG. 6 illustrates an exemplary artificial neural network according to an embodiment of the present disclosure.

FIG. 6 illustrates an example artificial neural network 600 that may be used to implement the vulnerability assessment model 312. As shown, the artificial neural network 600 includes three layers—an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement the entity prediction module 212 may include as many hidden layers (e.g., 50, 80, etc.) as necessary.

In this example, the artificial neural network 600 receives a set of input values and produces an output value. Each node in the input layer 602 may correspond to a distinct input value. For example, when the artificial neural network 600 is used to implement the vulnerability assessment model 312, each node in the input layer 602 may correspond to a factor that determines the likelihood of an attack that exploits a vulnerability or the impact value determined for the vulnerability. Even though only four nodes are shown in the input layer 602, any number of nodes can be included in the artificial neural network 600. For example, the input layer 602 may include as many nodes as the number of factors used to determine the likelihood of an attack that exploits a vulnerability plus one, such that each node in the input layer 602 may correspond to a factor or an impact value. In a non-limiting example, the node 608 may correspond to a first factor associated with whether a computer tool exists that assists malicious users to exploit the vulnerability, the node 610 may correspond to a second factor associated with a length of time that the computer tool has been made available, the node 612 may correspond to a third factor associated with a number of attacks that exploit the vulnerability within a predetermine period of time, the node 614 may correspond to an impact value, and so forth.

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that the nodes 616-618 may produce different values based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement the vulnerability assessment model 312, the output produced by the artificial neural network 600 may include a likelihood that an attack that exploits the vulnerability will occur or a severity score for the vulnerability.

The artificial neural network 600 may be trained by using training data. By providing training data to the artificial neural network 600, the nodes 616-618 in the hidden layer 604 may be trained (adjusted) such that an optimal output (e.g., an entity identification) is produced in the output layer 606 based on the training data. By continuously providing different sets of training data, and penalizing the artificial neural network 600 when the output of the artificial neural network 600 is incorrect (e.g., when the output severity does not match the actual outcome of the attack), the artificial neural network 600 (and specifically, the representations of the nodes in the hidden layer 604) may be trained (adjusted) to improve its performance in entity prediction. Adjusting the artificial neural network 600 may include adjusting the weights associated with each node in the hidden layer 604.

Figure 7:
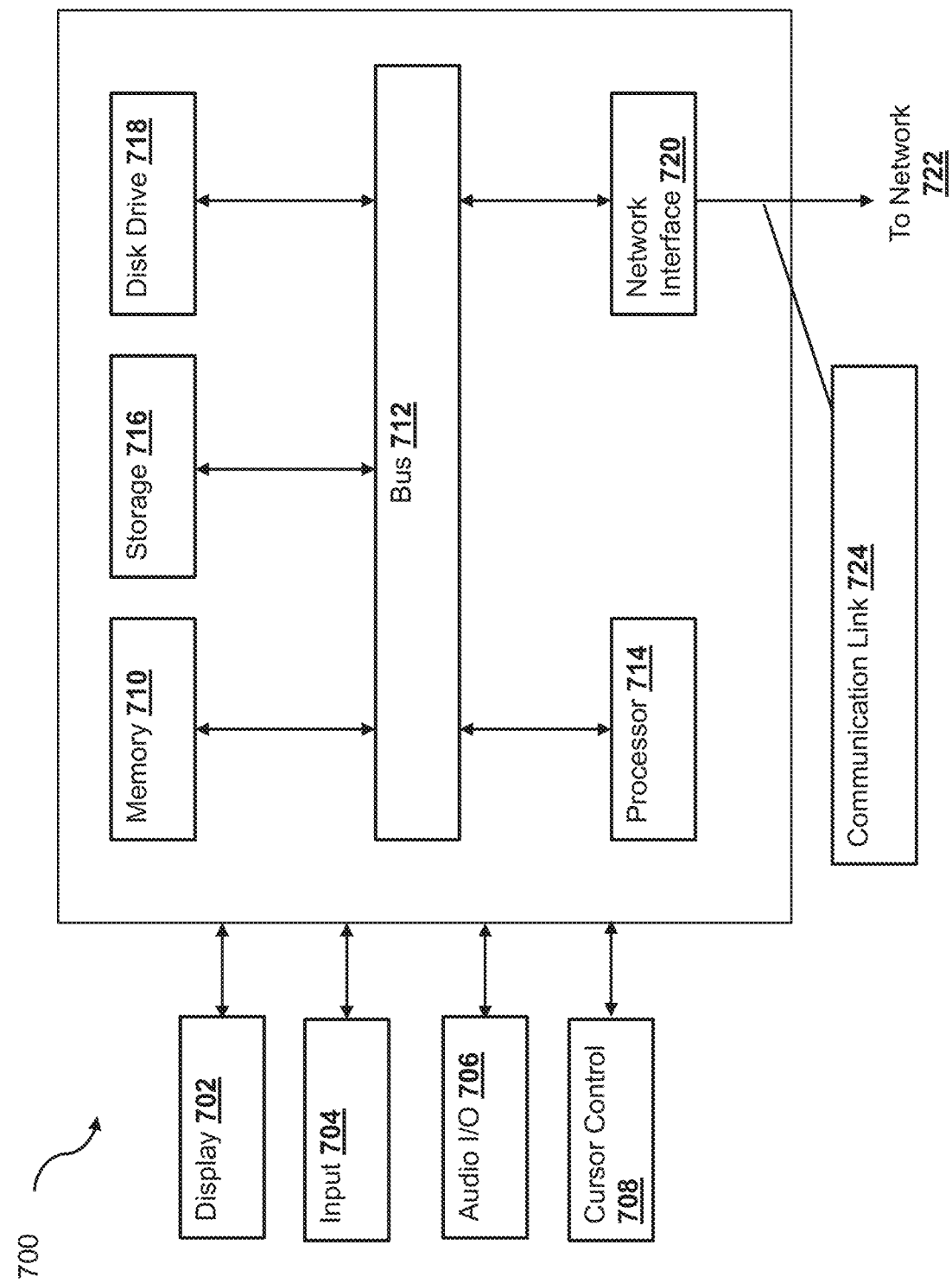
FIG. 7 is a block diagram of a system for implementing a device according to an embodiment of the present disclosure.

FIG. 7 is a block diagram of a computer system 700 suitable for implementing one or more embodiments of the present disclosure, including the web server 134, the mobile application server 136, the FTP server 204, the border gateway 202, the monitoring platform 145, the user device 110, the social media server 150, and the media server 160. In various implementations, the user device 110 may include a mobile cellular phone, personal computer (PC), laptop, wearable computing device, etc. adapted for wireless communication, and each of the web server 134, the mobile application server 136, the FTP server 204, the border gateway 202, the monitoring platform 145, the social media server 150, and the media server 160 may include a network computing device, such as a server. Thus, it should be appreciated that the devices 134, 136, 204, 202, 145, 110, 150, and 160 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio.

A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the vulnerabilities assessment functionalities described herein according to the process 400.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system for assessing vulnerabilities of a networked system, comprising:
   a non-transitory memory; and
   one or more hardware processors coupled with the non-transitory memory and configured to read instructions from the non-transitory memory to cause the system to perform operations comprising:
   monitoring, via a first device and based on a first perspective external to the networked system, a plurality of open access points usable for gaining access to the networked system;
   determining, based on the monitoring, that a subset of the plurality of open access points corresponds to a first vulnerability among a plurality of known network vulnerabilities;
   analyzing the networked system via a second device and based on a second perspective internal to the networked system, wherein the analyzing the networked system comprises (i) identifying, based on a network topology associated with the networked system, a portion of the networked system accessible through the subset of the plurality of open access points and (ii) determining a particular type of data stored within the portion of the networked system and accessible through the subset of the plurality of open access points;
   determining a sensitivity level of the particular type of data;
   determining an impact of the first vulnerability to the networked system based at least in part on the analyzing and the sensitivity level of the particular type of data, wherein the impact represents a potential exposure of the particular type of data due to an attack associated with the first vulnerability; and
   determining a severity of the first vulnerability for the networked system based on the impact.

2. The system of claim 1, wherein the first vulnerability is associated with a particular network communication protocol.

3. The system of claim 1, wherein the first vulnerability is associated with a service provided by the networked system.

4. The system of claim 1, wherein the operations further comprise determining a likelihood that the attack associated with the first vulnerability will occur based on at least one of a plurality of factors comprising: a number of available computer tools configured to exploit the first vulnerability, an amount of communication associated with the first vulnerability, a duration of time that the first vulnerability has been disclosed, or a number of previous attacks based on the first vulnerability, and wherein the severity of the first vulnerability is further based on the likelihood of the attack.

5. The system of claim 4, wherein the determining the severity comprises using a machine learning model to estimate the severity of the first vulnerability based on at least one of the plurality of factors and the determined impact of the first vulnerability to the networked system.

6. The system of claim 1, wherein the analyzing the networked system further comprises identifying a set of services provided by the networked system through the subset of the plurality of open access points.

7. The system of claim 1, wherein the determining the impact comprises determining a type of service that can be interrupted based on the attack on the networked system.

8. A method for assessing vulnerabilities of a networked system, comprising:
obtaining information regarding a plurality of network vulnerabilities;
scanning, based on a first perspective external to the networked system, a plurality of open access points usable to gain access to the networked system;
determining that a first network vulnerability from the plurality of network vulnerabilities is relevant to the networked system based on the scanning and a correlation between the first network vulnerability and a first open access point from the plurality of open access points;
analyzing the networked system based on a second perspective internal to the networked system, wherein the analyzing the networked system comprises (i) identifying, based on a network topology associated with the networked system, a portion of the networked system accessible through the first open access point and (ii) determining a particular type of data stored within the portion of the networked system and accessible through the first open access point;
determining a sensitivity level of the particular type of data; and
determining an impact of the first network vulnerability to the networked system based on the analyzing and the sensitivity level of the particular type of data, wherein the impact represents a potential exposure of the particular type of data due to an attack associated with the first network vulnerability.

9. The method of claim 8, wherein the networked system is configured to provide a set of services via the first open access point, and wherein the impact determined for the first network vulnerability represents an amount of time that the set of services will be interrupted based on the attack.

10. The method of claim 8, further comprising:
determining the correlation between the first network vulnerability and the first open access point, wherein the correlation indicates that the first open access point is usable to exploit the first network vulnerability within the networked system.

11. The method of claim 8, further comprising:
ranking the plurality of network vulnerabilities based on determined impacts of the plurality of network vulnerabilities on the networked system; and
presenting, on a device within the networked system, the ranking of the plurality of network vulnerabilities.

12. The method of claim 8, further comprising re-configuring the networked system based on the impact determined for the first network vulnerability.

13. The method of claim 12, wherein the re-configuring the networked system comprises modifying a security policy associated with at least one of the plurality of open access points.

14. The method of claim 12, wherein the re-configuring the networked system comprises closing at least one of the plurality of open access points.

15. A non-transitory machine-readable medium having stored thereon machine-readable instructions executable to cause a machine to perform operations comprising:
monitoring, via a first device and based on a first perspective external to a networked system, a plurality of open access points usable for gaining access to the networked system;
determining, based on the monitoring, that a subset of the plurality of open access points corresponds to a first vulnerability among a plurality of vulnerabilities;
analyzing the networked system via a second device and based on a second perspective internal to the networked system, wherein the analyzing the networked system comprises (i) identifying, based on a network topology associated with the networked system, a portion of the networked system accessible through the subset of the plurality of open access points and (ii) determining a particular type of data stored within the portion of the networked system and accessible through the subset of the plurality of open access points;
determining a sensitivity level of the particular type of data;
determining an impact of the first vulnerability to the networked system based at least in part on the analyzing and the sensitivity of the particular type of data, wherein the impact represents a potential exposure of the particular type of data due to an attack associated with the first vulnerability; and
determining a severity of the first vulnerability for the networked system based on the impact.

16. The non-transitory machine-readable medium of claim 15, wherein the first vulnerability is associated with a particular network communication protocol.

17. The non-transitory machine-readable medium of claim 15, wherein the first vulnerability is associated with a service provided by the networked system.

18. The non-transitory machine-readable medium of claim 15, wherein the operations further comprise determining a likelihood that the attack associated with the first vulnerability will occur based on at least one of a plurality of factors comprising: a number of available computer tools configured to exploit the first vulnerability, an amount of communication associated with the first vulnerability, a duration of time that the first vulnerability has been disclosed, or a number of previous attacks based on the first vulnerability, and wherein the severity of the first vulnerability is further based on the likelihood of the attack.

19. The non-transitory machine-readable medium of claim 15, wherein the operations further comprise re-configuring the networked system based on the severity of the first vulnerability.

20. The non-transitory machine-readable medium of claim 19, wherein the re-configuring the networked system comprises at least one of modifying a security policy associated with the subset of the plurality of open access points or closing the subset of the plurality of access points.

* * * * *